(No Model.) 9 Sheets—Sheet 4.

O. S. HARMON.
MACHINE FOR MAKING BAGS.

No. 267,197. Patented Nov. 7, 1882.

Fig. 4.

Attest:
Geo. H. Graham
Anthony O. Jasbera

Inventor,
Orville S. Harmon,
by Munson & Philipp
Att'ys.

(No Model.) 9 Sheets—Sheet 5.

O. S. HARMON.
MACHINE FOR MAKING BAGS.

No. 267,197. Patented Nov. 7, 1882.

(No Model.) 9 Sheets—Sheet 6.

O. S. HARMON.
MACHINE FOR MAKING BAGS.

No. 267,197. Patented Nov. 7, 1882.

Attest:
Geo. H. Graham
Anthony N. Jasbera

Inventor,
Orville S. Harmon,
by Munson & Philipp
Attys.

(No Model.) 9 Sheets—Sheet 7.

O. S. HARMON.
MACHINE FOR MAKING BAGS.

No. 267,197. Patented Nov. 7, 1882.

Attest:
Geo. R. Graham
Anthony N. Jabern

Inventor,
Orville S. Harmon,
by Munson & Philipp
Attys.

(No Model.) 9 Sheets—Sheet 8.

O. S. HARMON.
MACHINE FOR MAKING BAGS.

No. 267,197. Patented Nov. 7, 1882.

Attest:
Geo. H. Graham
Anthony L. Jasbera

Inventor;
Orville S. Harmon,
by Munson & Philipp
Attys.

(No Model.) 9 Sheets—Sheet 9.

O. S. HARMON.
MACHINE FOR MAKING BAGS.

No. 267,197. Patented Nov. 7, 1882.

Attest,
Geo. H. Graham
Anthony W. Jasbera

Inventor,
Orville S. Harmon,
by Munson & Philipp
Attys.

UNITED STATES PATENT OFFICE.

ORVILLE S. HARMON, OF BROOKLYN, NEW YORK, ASSIGNOR TO P. LORILLARD & CO., OF JERSEY CITY, NEW JERSEY.

MACHINE FOR MAKING BAGS.

SPECIFICATION forming part of Letters Patent No. 267,197, dated November 7, 1882.

Application filed February 19, 1881. (No model.)

*To all whom it may concern:*

Be it known that I, ORVILLE S. HARMON, a citizen of the United States, residing in the city of Brooklyn, county of Kings, and State of New York, have invented certain new and useful Improvements in Machines for Making Bags, fully described and represented in the following specification and the accompanying drawings, forming a part of the same.

A machine embodying my improvements, though operating to produce a bag or a tube with one end closed, is especially contrived for the purpose of making from paper or similar material, either with or without an outside layer of foil, a tubular wrapper with one closed end, adapted for the reception of fine-cut tobacco or other filamentous material, or for the enveloping of various articles of merchandise, such as are commonly packed in merchantable form in boxes, bags, and the like.

In the mode commonly practiced in making uniform packages of tobacco and similar packed materials it is usual to construct the containing-wrapper in tubular shape upon a hollow "former," one end of the wrapper being closed over the end of the hollow former, so that the bag-like wrapper may, while retained upon the hollow former, have the material to be packed introduced within it through the former without breaking or disrupting the wrapper; and although the machine illustrated is particularly adapted to fold a wrapper upon such a hollow former, it will operate and may be used to form such a wrapper upon a solid former, as will appear.

The improvements effected by me consist mainly in the following mechanisms: a former, upon which the tube or bag is to be formed, that is provided with means for reciprocating it to and from the folding devices; devices for causing the former, more especially when caused to carry a hollow former, to descend onto a forming-table to clamp the paper; peculiar folding mechanisms, both as to structure and operation; an improved clutch-releasing mechanism, and various constructions and combinations of parts, too fully hereinafter set forth and claimed to need preliminary description.

The mechanisms embodying my said improvements are illustrated in the accompanying drawings, which show the same, in Figure 1, by a front elevation, in Fig. 2, by a plan or top view, in Fig. 3, by a left-hand side elevation, and, in Fig. 4, by a right-hand elevation, the frame work in the last two figures being removed in part to expose the mechanisms. Fig. 17 illustrates a hollow former, carrying a wrapper folded upon it. Fig. 25 illustrates the structure of the wings of some of the folders.

The principal mechanisms embodied in this apparatus will first be described and their operating devices explained, that the subsequent description of the operation may be rendered clear.

Figures 15, 16:
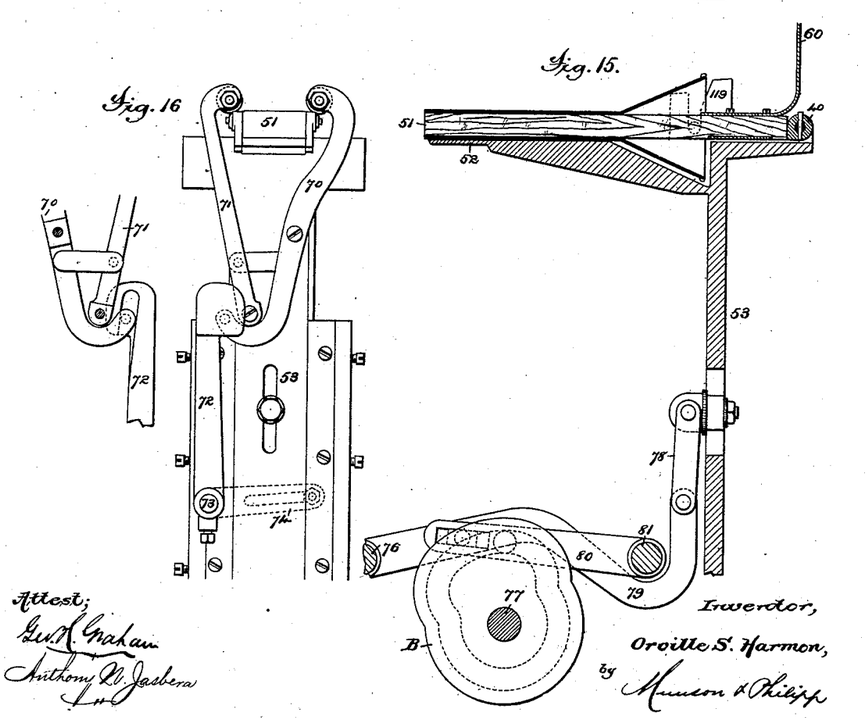
Fig. 15 shows a longitudinal sectional elevation of the former and its elevating and depressing mechanisms.
Fig. 16 shows the mechanism for clamping the former in its horizontal position.

A former, 51, of the shape and dimensions of the bag to be produced is arranged to operate in conjunction with a forming-table, 52. The former 51, which presents an exterior form of the shape and size of the bag to be produced, is pivoted near its rear end, at 40, (see Fig. 15,) to the table 52, so that it may oscillate vertically with respect to said table from the position shown in Fig. 3 to that shown in Fig. 15, and this former and forming-table are provided with a slide, 53, which moves in ways in the frame-work, whereby the two may reciprocate vertically and move from the position where the sheet to be folded is received to that in which said sheet is folded into a bag or closed tube. The oscillation of this former is accomplished as follows: It is provided with a slotted arm, 60, that rises from its rear end, in the slot of which runs a pin that projects from the end of a rock-arm, 61, that is fast upon a rock-shaft, 62. This shaft 62 is rocked by means of a rock-arm, 63, a connecting-arm, 64, and a rock-arm, 65, from a transverse shaft, 66, to which movement is imparted by a lever, 67, that may be moved by hand, foot, or other power. Said lever is supplied with a retracting-spring, 68, that is connected with an arm, 69. The former is locked in its seated position upon the forming-table, when rocked forward into the position shown in Figs. 15, 16, by means of clamping-arms 70 71, the jawed upper ends of which carry friction-rolls that run onto and rest upon the upper surface of the shank of said former. These levers are pivoted to the slide 53, and are linked together, as is shown in Fig. 16. The lever 70 has its power end curved and provided with a pin that engages and plays in the slotted end of a rock-arm, 72, that is fast upon a short rock-shaft, 73, that is journaled in the frame-work, in part of which the slide 53 works. (See Fig. 5.) This shaft 73 is provided with a rock-arm, 74, to the end of which is pivoted a lever, 75, that is hung on a rod, 76, and provided with a pin or stud that works in the groove of a cam, A, that is mounted fast upon the main shaft 77. (See Figs. 4, 5, 16.)

The former and forming-table are concertedly reciprocated vertically by means of the slide 53, which is connected by a link, 78, to a lever, 79, that is hung on the rod 76, and which lever 79 is vibrated by a second lever, 80, hung on a rod, 81, and provided with an arm or stud to engage the lever 79, and with a stud or roll that travels in the groove of a cam, B, which is mounted fast upon the main shaft 77. (See Figs. 4, 5, 15.) When the descent of these devices is made the clamping-arms 70 71, locked over the former by their hooked ends, also descend, the pivot by which they are operated moving out of the slot in the end of the rock-arm 72.

Figure 21:
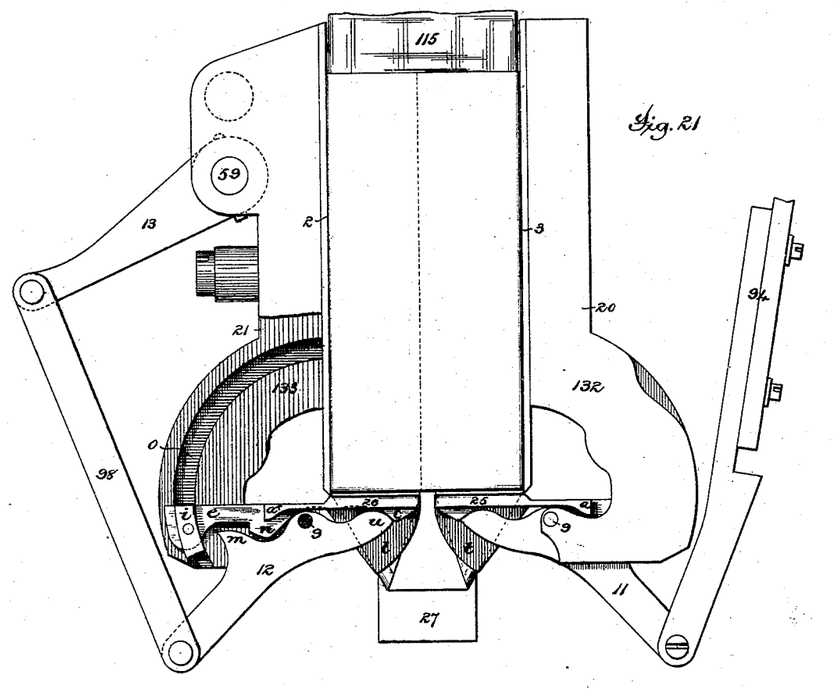
Fig. 21 is a plan view, representing the operation of turning in the side end folds, obstructing upper portions of the mechanism being removed.

In conjunction with the forming-table 52 and the former 51 there is arranged a series of folders that operate to convert a sheet of paper clamped between the former and the forming-table into a tube by lapping the free edges of said sheet upon said former. Of these a guiding-stock, 20, and a similar guiding-stock, 21, are arranged so that their longitudinal face-plates 2 3 (see Figs. 1, 2, 21) constitute a folding-box, between which the forming-table 52 and former 51 descend, during which movement the projecting sides of the sheet are upturned or raised vertically between said plates 2 3 and the sides of said former.

Figure 2:
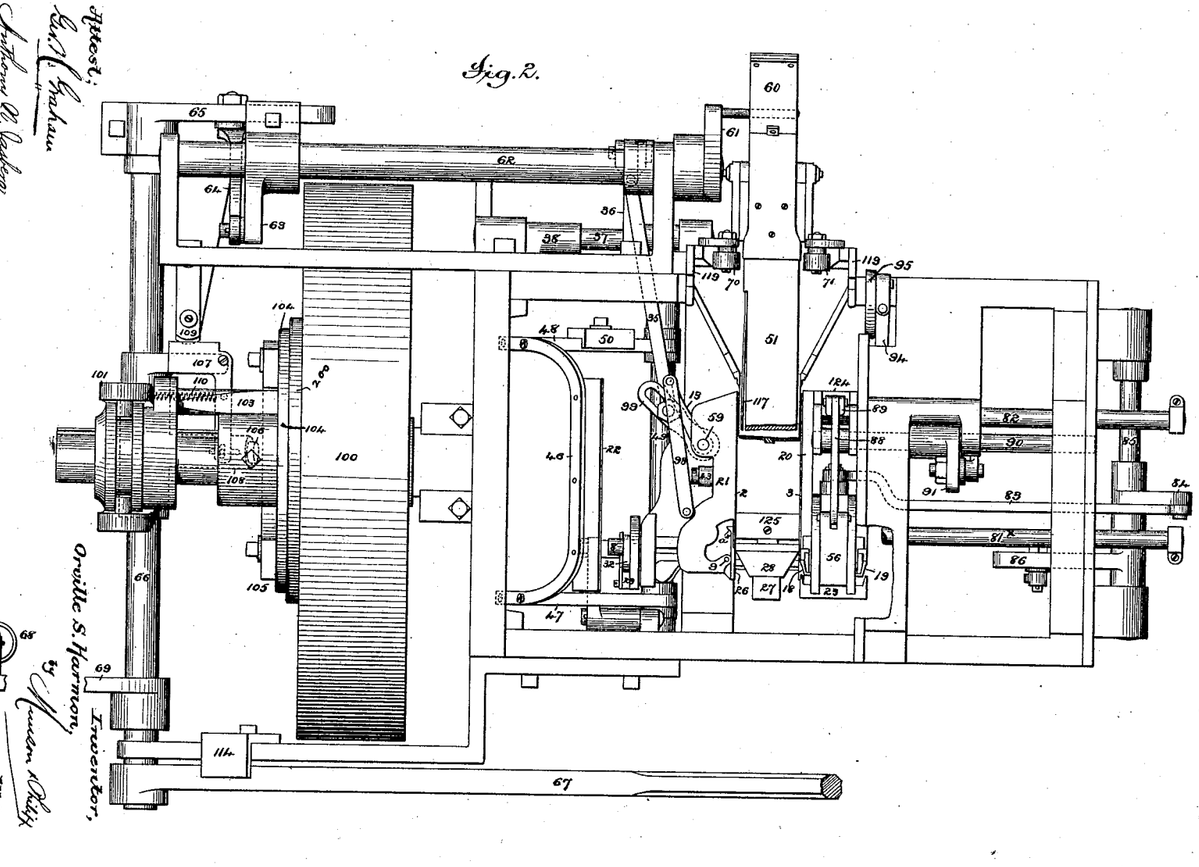
Figure 18:
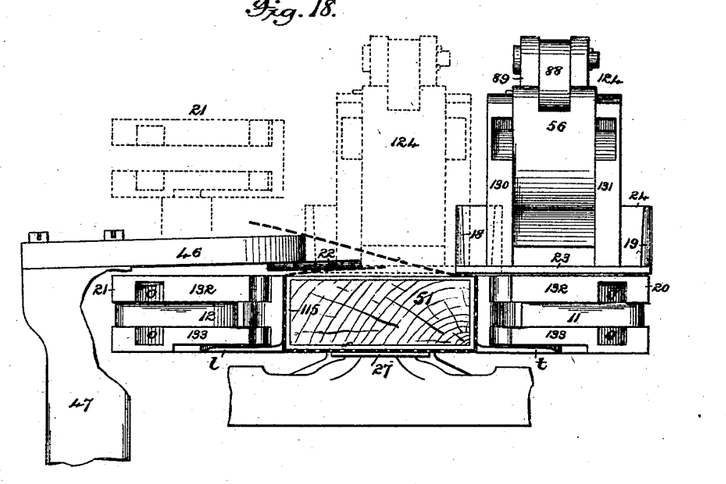
Fig. 18 shows a sectional elevation illustrating the operation of folding the material into the form of a tube.

The primary side-lapping folder consists of a reciprocating blade, 22, carried by a frame, 46, Figs. 2 and 18, that is supported at the ends of rock-arms 47 48, that are fast to a rock-shaft, 49. These arms are vibrated to reciprocate the folder 22 by means of an adjustable arm, 50, one end of which embraces the arm 48, Figs. 2 and 3, while its lower end, slotted for adjustment, is pivoted to a rod, 54, that is connected by a link to a lever, 55, that is hung on the rod 76, and provided with a stud or roll that engages the groove of cam D, fast on the shaft 77. (See Fig. 5.)

Figure 1:
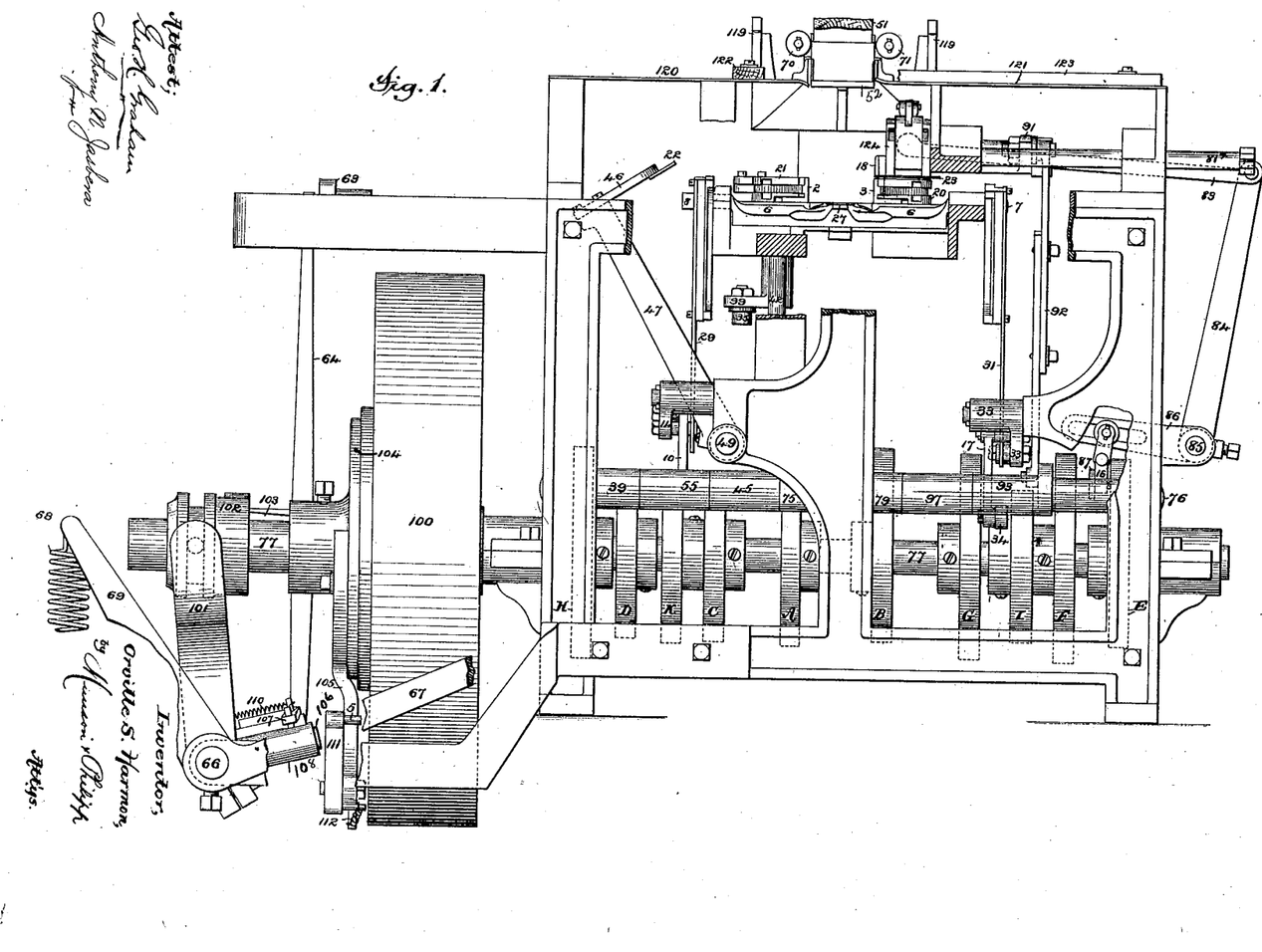

The second side-lapping folder consists of the bottom plate, 23, of a horizontally-reciprocating carrier, 124, Figs. 1, 2, 18, that is mounted to slide in the frame-work by means of guide-rods 81$^x$ 82. (See Fig. 2.) The reciprocating movement is imparted by means of a rod, 83, pivoted at one end to the carriage and by its other to a rock-arm, 84, carried by a rock-shaft, 85, (see Fig. 2,) from which rock-shaft 85 there projects another rock-arm, 86, whose slotted end is connected by a link, 16, to a lever, 87, (see Fig. 1,) that is hung on the rod 81, which lever is provided with a slide or roll that travels in a groove of a cam, E, that is fast on the shaft 77. (See Fig. 5.)

The guiding-stock 21 not only forms part of the folding-box, but acts as the final side-lapping folder, and in order to accomplish this function it is mounted so as to reciprocate vertically, which movements are accomplished as follows: It is provided with vertical guide-rods 41 42, which slide in the frame-work, Fig. 3, and has a depending adjustable rod, 43, which is pivoted to a lever, 44, hung on rod 81, which lever is engaged by a lever, 45, hung on rod 76, and actuated by a cam, C, on shaft 77, (see Figs. 3, 4, 5,) the construction and operation of which levers are like those marked 79 80.

Figure 19:
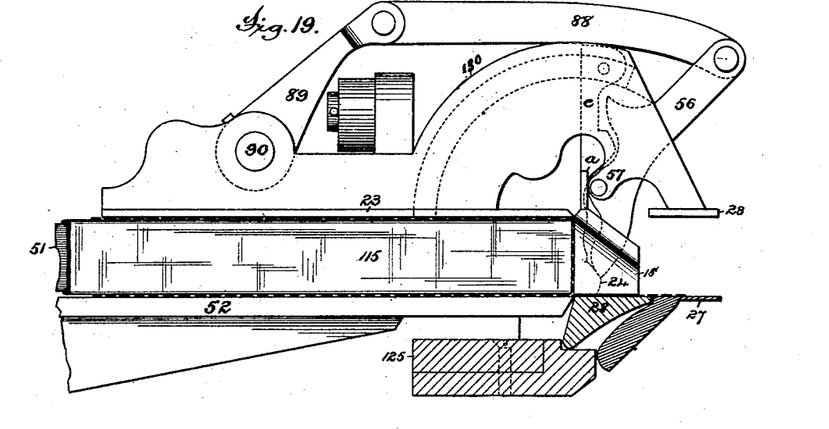
Fig. 19 is a similar view, illustrating the operation of forming the first end fold.
Figure 20:
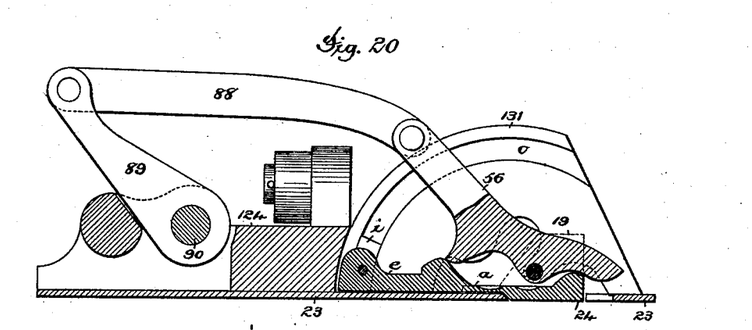
Fig. 20 is a sectional elevation showing the normal position of the folder for forming the first end fold.

The primary lap of the end fold of the tube is accomplished by means of a swinging folder, 24, Figs. 2, 18, 20, that is mounted on the end of the carrier 124, supporting the lapping-folder 23, said folder 24 being a plate adapted to lie in the same horizontal plane as the plate or folder 23, (see Fig. 20,) and to be oscillated from that position to one at right angles to the plate 23. (See Fig. 19.) This folder 24 is provided with end wings, 18 19, and with a back plate, a, which forms a stop engaging the top of folder 23, and determining the relative position of said folder with the plate 23 when the two lie in the same plane. This folder is peculiarly hung in a carrier, 124, Fig. 18, the side plates, 130 131, of which are slotted, and in which slots pins on the outer end of its arm e run as partial guides for its movement. The face of the arm e is of peculiar shape, as is that of the bearing-face of the rock-arm 56. Such shapes coact with the said slots in accomplishing the oscillation of the folder; but as this mode of actuating a folding-blade is particularly hereinafter described in connection with the folder 26, which is constructed and operated in precisely the same manner, no explanation is required here.

The wings 18 19 are each constructed with a recessed face, so as to provide a removed portion to accommodate the doubled paper, and with a projection to impinge upon and press the line of fold; but this will also be described in part by reference to the folder 26, that being constructed in that manner.

The oscillations of the folder 24 are produced by means of a rock-arm, 56, that is pivoted at 57 to side plates, 130 131, of the carrier 124, said rock-arm being actuated by a rod, 88, pivoted to it and to a similar arm, 89, fast to a shaft, 90, that turns in journals in the said carrier 124 and the frame-work. (See Fig. 2.) Upon this shaft 90 there is hung a rock-arm, 91, which is provided with a spline that engages a groove in the shaft 90, and thus permits said shaft to reciprocate without being disconnected from said rock-arm. (See Fig. 4.) This rock-arm 91 is connected by an adjustable arm, 92, with a lever, 93, that is hung on the rod 76, from which lever extends a stud or roll that runs in the groove of a cam, F, on the shaft 77. The side folds of the end are turned in by laterally-oscillating folders 25 26, that are supported at the forward ends of the guiding-stocks 20 and 21 by their top and bottom plates, 132 133. One of these folders—namely, that marked 26—will now be particularly described. (See Figs. 18 and 21.) It consists of a plate having a width equal to that of the plate 2 and a length forward of its center of motion enabling it to span nearly one-half of the front end of the former. Its shank consists of a stop, $a^x$, that limits its backward movement and sustains it in alignment with the plate 2, as in Fig. 2, said shank terminating in an arm, $e$, (see Fig. 21,) to which are pinned bearers $i$, that run in curved slots $o$, with which the inner faces of the top and bottom plates, 132 133, of the guiding-stock 21 are provided. These slots $o$ are arcs having the front inner edge of the plate 2 and the corner of the former as their center, said edge and corner (which are practically in contact) thus becoming the center of motion of the folder. From the rear surface of the folder two angular-faced lugs, $c n$, project, with which lugs two fingers, $u m$, that are carried by the actuating rock-arm 12, engage. This rock-arm 12 is pivoted at 9 to the plates 132 133, and its oscillations are produced by means of a vertical rock-shaft, 59, that is journaled in the guiding-stock 21 and frame-work of the machine, (see Fig. 3,) to an arm, 13, projecting from said shaft, to which the rock-arm 12 is connected by a rod, 98. Upon said rock-shaft 59 another rock-arm, 99, is mounted, and provided with a spline entering a groove in the shaft, so that the latter may reciprocate without disengagement from the former. The rocking movements of this arm 99 are effected by means of a rod, 35, that is linked to a rock-arm, 36, fast on a shaft, 37, from which another rock-arm, 38, Fig. 5, projects inwardly. This latter rock-arm is engaged by a lever, 39, that is hung upon the rod 76, and provided with a stud or roll that runs in the groove of the cam H on the shaft 77. When the parts are in their retracted positions the folder 26 is held in place by means of the fingers $m u$, which then rest upon the highest parts of the lugs $n c$, as is the case with the folder 24, (see Fig. 20,) which, being constructed to operate as does this folder 26, will be referred to in aid of this description of such operation. As the actuating rock-arm is moved forward its finger $u$ presses upon the lug $c$ while the pressure of its finger $m$ upon the lug $n$ is relieved, such forward pressure causing the folder to be guided in the slots $o$ and to swing into a position at right angles to that from which it started, and thus to perform its folding operation. In this movement the fingers $m$ and $u$ gradually pass down the inclined rear surface of the lugs $n c$, for the reason that the centers of motion of the folder and rock-arm are at variance, and finally said fingers arrive at the positions shown in Fig. 21, when the forward motion of the folder is complete, at which time the finger $u$ presses firmly upon the lug $c$. In the rearward movement the lug $c$ is relieved from the pressure of the finger $u$ and the finger $m$ presses upon the lug $n$, said fingers mounting the inclined sides of the said lugs until the rearward position of the parts is accomplished, as in Fig. 20, when the folder is firmly held.

Figure 4:
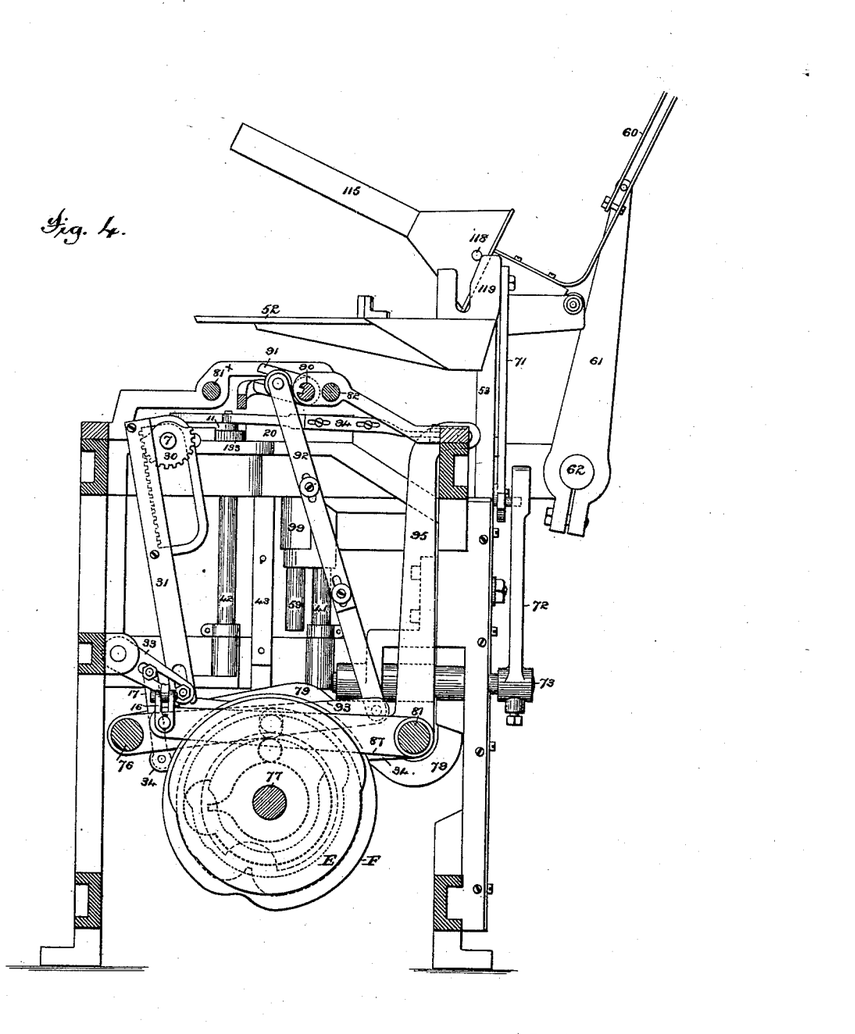
Figure 5:
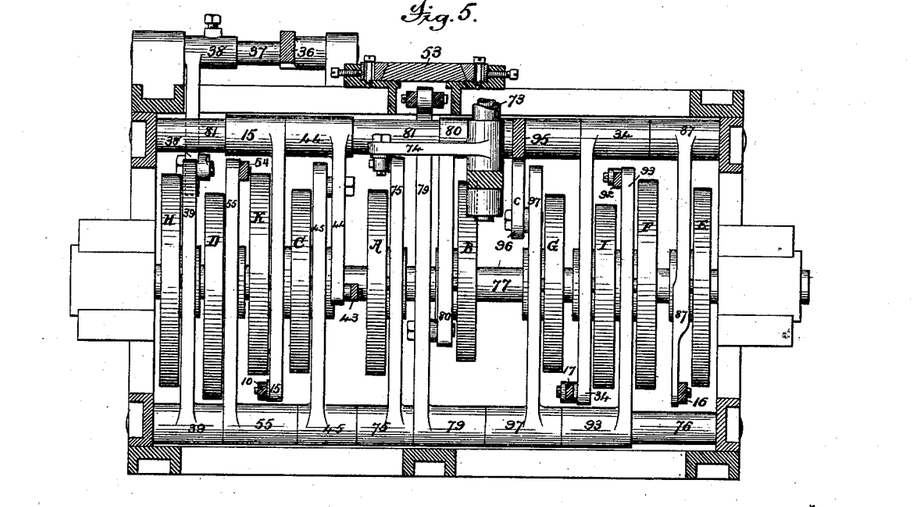
Fig. 5 shows a plan view of the driving-cams in position, while Figs. 6 to 14, inclusive, show elevations of said cams as removed from the machine.

The folder 25 is constructed and operated in precisely the same manner by a rock-arm, 11, which rock-arm is pivoted at 9 to the top and bottom plates, 132 133, of the carrier 20, its oscillations being accomplished by means of an adjustable rod, 94, Fig. 4, connecting it with a bell-crank lever, 95, that is hung on the rod 81, and whose short arm, 96, Fig. 5, is provided with a stud or arm, that is engaged by a lever, 97, hung on a rod, 76, the roll or stud of which runs in the groove of a cam, G, on the shaft 77. A folder constructed in this manner requires no hinge or other means of connecting it with the plate, folder, former, or other surface sustaining the material to be folded, and with respect to which a sharply-defined angle is to be made, and consequently a bearing-face is presented against the material close to the line upon which it is to be folded.

Figures 6, 7, 8, 9, 10, 11, 12, 13, 14, 17, 25:
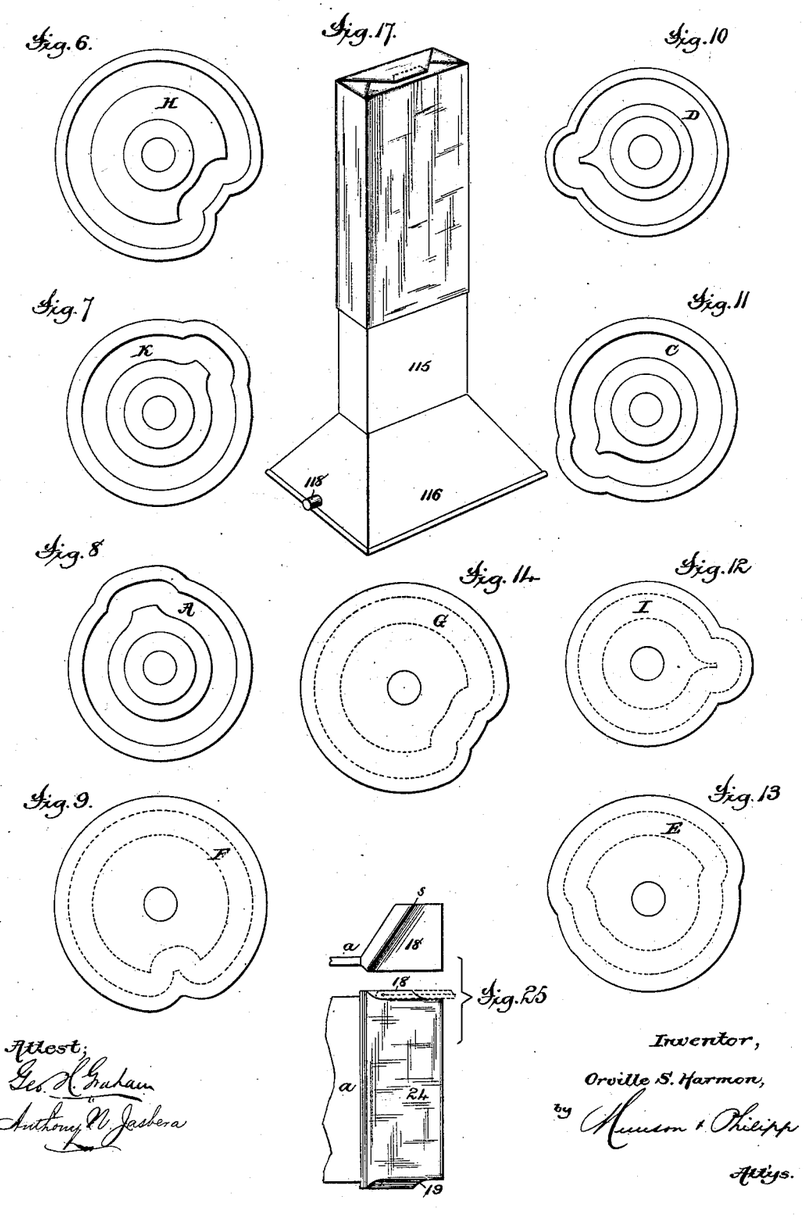
Figure 30:
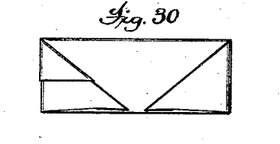
Figs. 30, 31, and 32 illustrate the end of the bag in various stages of its foldings.

The folder 25 is provided with a wing, $t$, and the folder 26 has a wing, $l$, which wings are constructed as are the wings 18 19 of the folder 24. Their structure and operation will be understood from the following description: The outer or bearing face of each wing is recessed, as is shown in Fig. 25, so as to provide room for the plies of that portion of the end of the tube that is doubled by the action of a folder in laying down a flap, and the double angular edge produced by such folding is acted upon by a projection, as $s$, which presses upon it and causes it to lie smooth, and not spring the plies apart when the folder is retracted. Thus, as the folder 24 is oscillated to lay the primary end fold, it draws the material composing the sides of the projecting end of the tube over upon itself, so that it forms a double ply, united by an angular line of doubling, as appears from Fig. 25. If this doubling is simply caused by the drawing action of the folder 24, it would, when that folder is retracted, spring apart by its inherent elasticity, and thus prevent the proper inward folds of the sides to be accomplished as in Fig. 30; but by providing the wings the doubled material is not only accommodated, but the doubled line so pressed as to cause the plies to lie snugly together without any tendency to spring apart, whereby a succeeding fold may be surely made without danger of disruption. In addition to this function of the wings, those of the folders 25 26 perform the additional function of acting as folding-guides, their construction being such that their corners are brought into a position to register with the folding-point of the folder 27, and thus act during the beginning of the folding operation of that folder as an edge over which the re-enforcing lap is turned, said wings being retracted with their folders in time not to impede the completion of such folding.

Figure 22:
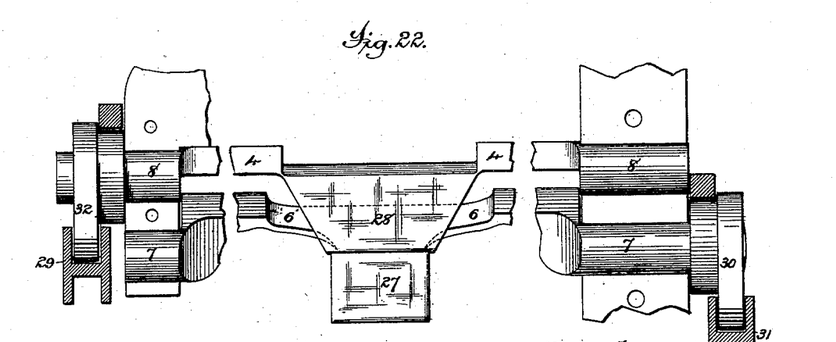
Fig. 22 is an end elevation, illustrating particularly the operation of two of the end-folders.

The re-enforcing fold of the last end flap is accomplished by an oscillating folder, 27, which is a plate supported by a frame, 6, the opposite ends of which are journals 7, turning in the frame-work. (See Fig. 22.) The right-hand journal 7 is extended through the frame, and provided with a segment, 30, which meshes with a reciprocating rack-bar, 31, that is provided with a guide-loop, keeping it meshed with the segment. This rack-bar 31 is pivoted at its lower end to a slotted rock-arm, 33, Fig. 4, that is connected by a rod, 17, with a lever, 34, that is hung on the rod 81, and provided with a stud or roll that runs in the groove of the cam I on shaft 77. This folder is thus caused to oscillate with the outer upper edge of the folder 28 for its center of motion.

The final fold or doubling of the last end flap is accomplished by an oscillating folder, 28, which is a plate supported by a frame, 4, the opposite ends of which are journals 8, turning in the frame-work. The left-hand journal 8 is extended beyond the frame and provided with a segment, 32, Fig. 22, that meshes with a reciprocating rack-bar, 29, which is provided with a guide-loop, keeping it meshed with the segment. The rack-bar 29 is pivoted at its lower end to a slotted rock-arm, 14, Fig. 3, that is connected by a rod, 10, with a lever, 15, that is hung on the rod 81, and provided with a stud or roll that runs in the groove of a cam, K, on shaft 77.

The longitudinal cam-carrying shaft 77 is journaled in the frame-work and provided near its end with a fast clutch, 104, and a loose driving-pulley, 100, the movements of which latter may be imparted to said shaft by means of the clutch, which is thrown into operative connection therewith by means of a stirrup-arm, 101, that is fast upon the shaft 66, which latter is rocked by the lever 67. As here shown, this arm 101 reciprocates a collar, 102, that travels on a spline projecting from the driving-shaft 77, which collar carries a wedge, 103, which enters a hole in the clutch 104 and operates levers that expand the peripheral spring of the clutch, so as to lock it fast to the rim 200, fixed to the face of the pulley 100, all as shown in United States Letters Patent No. 150,653.

Figure 3:
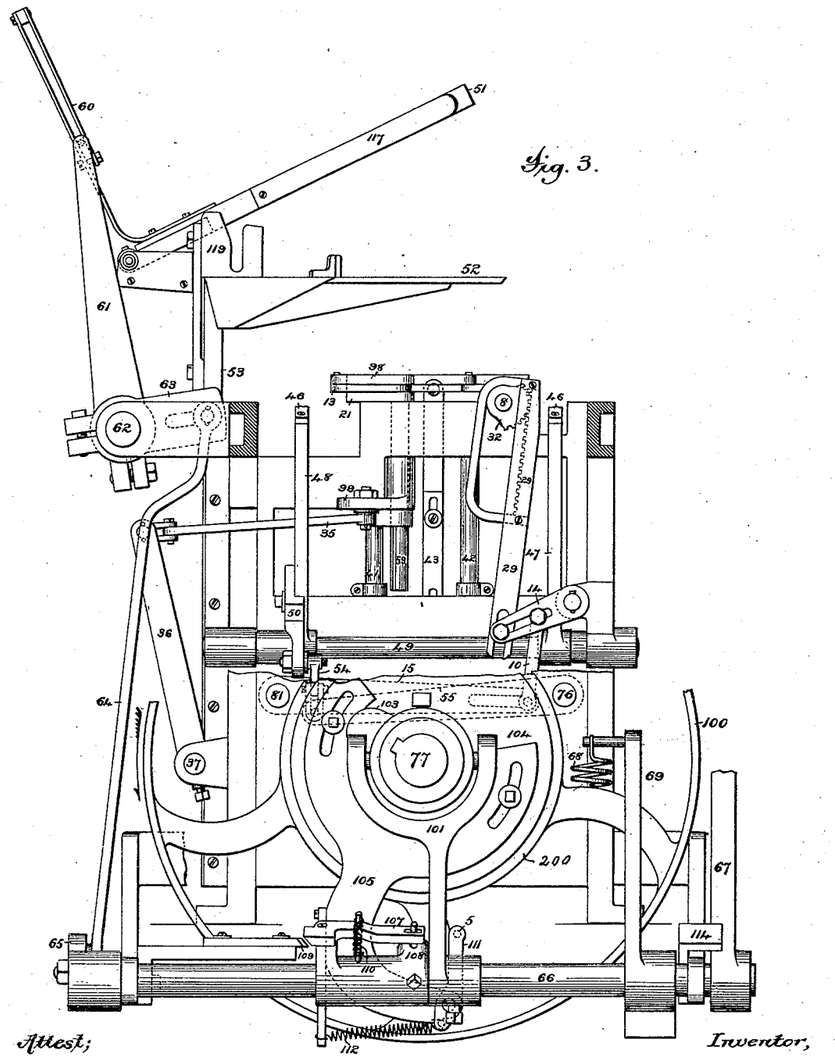

Although the mechanism described may be made to constantly operate and be provided with automatic feeding and discharging devices, it is here shown as arranged for hand-feeding, to facilitate which the machine is supplied with devices whereby it may be positively stopped at each complete operation of its devices to provide time for removing its product and feeding new material to it. These arresting devices consist of an unclutching mechanism, as follows: The clutch 104 carries a projecting bar, 105, (see Fig. 3,) whose curved end carries a pivot-dog, 111. When the driving-pulley 100 is clutched to the shaft 77 the clutch 104 and its bar 105 revolve. This carries the face of the dog 111 into contact with a stud, 106, that is carried by and is moved longitudinally in and out of the end of a rock-arm, 108, that projects from a sleeve fast upon the shaft 66. When this stud 106 is engaged by the face of the dog 111 the latter is moved rearwardly until its stop-pin 5 rests upon the bar 105. The face of the dog then acts as a lever operating, as the onward movement of the dog is continued, to press upward on the stud 106, and thus raise the rock-arm 108, thereby rocking the shaft 66 and through arm 101 moving the collar 102 so as to withdraw the wedge 103 and release the clutch 104 from the pulley 100, which then runs freely on its shaft. As the rock-arm 108 is forced upward it raises the bell-crank lever 107 (see Figs. 2 and 3) clear from the fixed seat 109, and thus allows the spring 110 to draw back the stud 106 into the arm 108, the stud being connected to the end of the bell-crank by a pin, as clearly shown in Figs. 1 and 2, thus releasing the dog 111, which is then caused to resume its normal position, as in Fig. 3, by the action of its spring 112. The rock-arm 69 is thus rocked backward and is carried to its rearmost position by the action of its spring 68, which so moves it until it is arrested by the contact of lever 67 with the stop 114. (See Fig. 2.) It is to be remarked that the wedge 103 is so formed that when it is pressed into the clutch 104 it will bind or stick sufficiently to resist the tension of the spring 68, so that the parts will remain clutched until the wedge is started by the unclutching mechanism, as just described. The rearward rocking of this shaft 66 raises the former, as shown in Figs. 3, 4, and the stop 114 determines the extent to which said former shall be raised.

As this apparatus is especially intended to form the bag upon the end of a hollow former, 115, as in Fig. 17, which former is constructed with a flaring mouth, 116, which acts to guide the substance to be bagged into the hollow former, in the lower or bag-covered end of which it may be pressed and finally deposited in the bag by stripping said hollow former from it, the operation of the machine will be described in connection with said hollow former; and first it should be explained that the former 51 will, when it is to act as a carrier for said hollow former, be preferably provided with a spring, 117, at one or both sides, that act as frictional bearings, retaining the hollow former in place upon it. In order to secure the proper position of said hollow former, it is provided with projecting studs, as 118, that engage inclined stops 119, fixed to the slide 53, which arrest it when it has been slid onto the former 51 to its correct position—the angular position to which the former may be raised, as governed by the stop 114, which insures the proper adjustment of said hollow former.

For convenience of hand-feeding, the apparatus is provided with a feeding-table consisting of two plates, 120 121, (not shown in Fig. 2,) between which the former descends, which plates are provided with gages 122 123, as is common.

Figure 23:
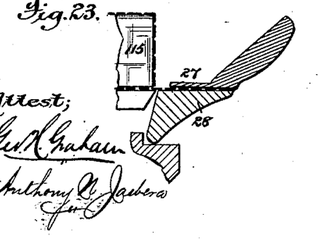
Fig. 23 illustrates the mode of forming the double lap of the last end-closing flap.
Figure 24:
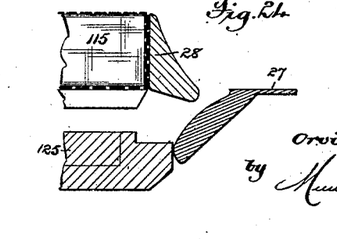
Fig. 24 shows the operation of folding the last end-closing flap.
Figure 26:
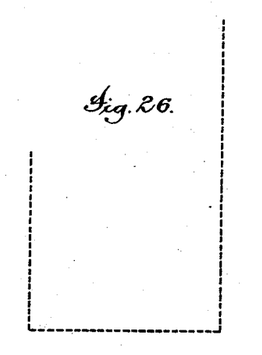
Figs. 26, 27, 28, and 29 are diagrams illustrating the successive folds necessary in converting a sheet into a tube.
Figure 27:
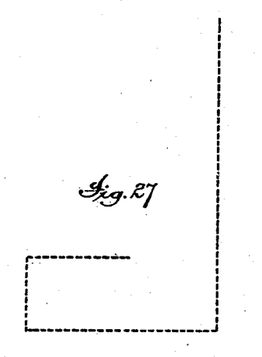
Figure 28:
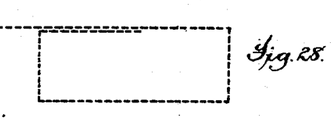
Figure 29:
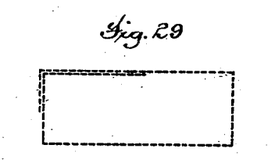
Figure 31:
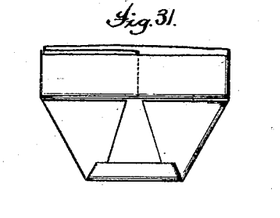
Figure 32:
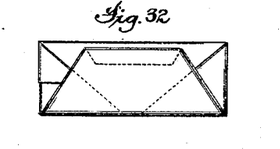

The operation is as follows: Supposing the apparatus to be stopped, at which time the clutch is released, the lever 67 is raised, and the former stands in its highest position. (See Figs. 1 and 3.) The material to make the bag, whether it is a sheet of paper or superposed sheets of foil and paper, is placed against the gages 122 123 beneath the former, which latter has a hollow former, 115, slid upon it, as in Fig. 4. The lever 67 is now depressed, throwing the clutch 104 into connection with the pulley 100 to operate the cam-shaft 77, and to simultaneously depress the former, so that it clamps the material between the lower surface of the hollow former 115 and the upper surface of the table 52. The cam A then depresses lever 75 to rock the shaft 73 and vibrate the rock-arm 72, whose slotted head causes the clamping-arms 70 71 to close, thereby moving their hooked ends over the shank of the former 51, and thus securely clamping it in its depressed position upon the forming-table 52. The cam B next comes into operation, and depressing lever 80 causes it to depress the lever 79, which acts to draw down the slide 53, and with it the forming-table and former. As the forming-table and former descend while in their locked positions, they carry the material between the plates 120 121, forming the feeding-table, and descend between the guiding-stocks 20 21, thereby causing the sides of the material to be upturned, as in Fig. 26, between the sides of the hollow former 115 and the face-plates 2 3 of said guiding stocks 20 21. When the forming-table reaches its lowest position its forward end may rest upon a seat, 125, or a rest-block secured thereto. The cam D now comes into operation, and, through the lever 55 and arm 54, rocks the arms 47 48, and causes the reciprocation of the primary folding-blade, 22, which lays the short flap down onto the upper side of the former, as in Figs. 18 and 27. About simultaneously with this movement the cam E comes into operation and causes the reciprocation of the opposite or second lapping-folder, 23, through the lever 87, rock-arms 86 84, and rod 83. This folder 23, in thus moving forward, laps the second side fold onto the first side fold, and when it has reached a position over the overlapped folds so as to secure the end of the first fold, and while it still moves forward, the return motion of the primary lapping-folder, 22, begins and is accomplished. In thus delaying the return movement of the primary lapping-folder until the second folder has advanced far enough over the former in folding the second lap to bear upon and secure the end of the first lap, it will be apparent that any liability of the latter laps being withdrawn or moved out of place by such return movement will be avoided. As soon as the second lapping-folder, with its carrier, reaches the position over the former, when the edge of its plate 23 will be aligned, or nearly so, with that of the former, and at which time the last side lap folded by it will have its free edge projecting beyond that of the former, as in Fig. 27, and overlying the guide 21, the cam C comes into operation, and, through the levers 45 44 and rods 43, causes a vertical reciprocation of the guiding-stock 21. As this guide moves upward the projecting free edge of the material gives way before it, so that the guide may rise above said edge, as in Fig. 18, dotted lines, and in its downward movement, at which time the folder 23 is brought even with the edge of the former, as in dotted lines, Fig. 18, the face-plate 2 of said guiding-stock 21 re-engages the projecting material and doubles it down over the side of the former so that it lies snugly against the inner side fold, as in Fig. 29. These foldings convert the material into a tube lapped around the former, where it is held in a box-like structure constituted by the former, the table 52, the face-plates 2 3 of the guiding-stocks 20 21, and the plate or folder 23 of the carrier 124. The cam F now comes into operation, and, through the lever 93, rod 92, and rock-arm 91, rotates the shaft 90, which, by means of the rock-arm 89 and rod 88 causes the primary end-folder, 24, actuated by the rock-arm 56, to swing downward against the end of the former. This folds down the first end lap, and the wings 18 19 of said folder 24 cause the said lap to lie snugly in place, and its points of union with the said end laps to be nicely folded, as is seen in Figs. 19 and 25. When the return motion of this folder 24 is accomplished the side end-folders, 25 26, are vibrated simultaneously by the action of the cams G H. These folders turn the side laps centrally against the primary fold on the end of the former, as in Fig. 30, and the wings $l\,t$, which project from their lower edges, cause the points of union of the material between these side laps and last end lap to lie snugly together and be pressed smooth, as in Fig. 31. As these side end-lapping folders oscillate the cam I comes into operation, and, through the lever 34, rack 31, and segment 30, rock the swinging folder 27, upon the face of which the extreme end of the bottom lap lies, as in Fig. 19, said folder turning upward, and thereby causing said extreme end of the bottom lap to be doubled upon itself, with the forward extremities of the wings *l t* as folding-guides, and to be pressed onto the face of the final lapping-folder, 28, as in Figs. 23 31. The rotating movement of the folder 27 begun, the cam K comes into operation, and, through the lever 15, rock-arm 14, rack 29, and segment 32, causes the final lapping-folder, 28, to swing upward and double the last lap against those that have preceded it upon the end of the former, as in Figs. 24, 32. This accomplished, the carrier supporting the folder 23 retreats, and as the final lapping-folder, 28, is retracted the cam B again comes into operation to raise the table 52 and former up to the normal position. The cam A thereupon, again coming into operation, causes the rock-arm 72 to re-engage the arm 70 and release the arms 70 71 from their engagement with the former. The dog 111 next engages the stud 106, thereby raising the rock-arm 108, rocking the shaft 60, and, through the rod 64 and rock-arm 61 raising the former to its normal position, as in Fig. 4, when the bottom-former 115, having upon its end a perfectly-formed bag, as in Fig. 17, may be removed from the machine, a second or uncovered hollow former be placed upon the former 51, as in Fig. 4, a new sheet be laid upon the folding-table, and the mechanisms be set into operation to repeat their action by depressing the lever 67.

It is apparent that a naked former, as 51, may be used in this operation of forming bags, and that the same, when raised to the normal position, may have the bags stripped therefrom. The former may reciprocate to its seat upon the table, instead of being oscillated in its movements to and from that position.

The table 52, though shown as of the same width as the former, is but a clamp for holding the sheet in place upon the under surface of the former, and therefore may be of any construction that will accomplish that end. Thus the former might have a simple spring or springs fixed to its under surface to receive and hold the sheet, and, descending therewith, operate to produce the tube, as before explained, in which case the hollow folder 115 would be omitted, and no oscillation of the former from its highest horizontal position would be required, and even when the hollow folder is used it might have the same construction, and the oscillation mentioned be used or not. The structure shown is a preferred one, and its parts will be designated hereinafter by their general names.

By throwing the end-forming folders out of action or omitting them the machine will produce tubes with open ends.

What is claimed is—

1. The combination, with a former and means for moving it to and from guiding-stocks, of guiding-stocks, as 20 21, the face-plates whereof form a folding-box, one of which stocks is provided with means for reciprocating it to fold the edge of the overlapped ply of the sheet, and fold the same upon the side of the tube, all substantially as described.

2. The combination, with the former, of the folders 22 23, and means for reciprocating said folders, so that the folder 22, after laying the first lap, shall dwell and hold the same until the folder 23 has advanced over the edge of said first lap, all substantially as described.

3. The combination, with the former, of the folders 22 23 and stock 21, and means for reciprocating the latter, all substantially as described.

4. The combination, with the former, of the reciprocating carrier 124 and the oscillating primary end-lap folder, 24, substantially as described.

5. The combination, with the former, of the reciprocating carrier 124, and oscillating folder 24 and its wings 18 19 with the folders 25 26, whereby the plies forming the projecting sides of a tube end are laid snugly together, and the folded edge thereof is pressed, substantially as described.

6. The combination, with a former and forming-table and means for carrying the two into co-operative relation, of a series of side-lapping folders, whereby a sheet of material is lapped about the former and converted into a tube, said side-lapping folders being also provided with devices for partially closing the end of the tube, all substantially as described.

7. The combination, with a forming-table and a former pivoted or hinged thereto, of means for oscillating the former, a slide carrying said former and table, and means for reciprocating said slide to carry said former to and from the position of co-operation with the folding mechanisms, all substantially as described.

8. A folder having a wing or wings provided with a recessed face, whereby a space is provided for the lapped plies of material and the folded edge of the same is pressed, substantially as described.

9. The combination of the table and oscillating former, and means for bringing the former onto the table, and means for locking the former, all substantially as described.

10. The combination, with a support for one side of the material, of a folder operating upon the opposite side of the material, and provided with a wing or wings recessed to accommodate the plies of folded material and press its doubled edge or line of fold, all substantially as described.

11. The combination, with the former and folders 24, 25, 26, and 28, of an auxiliary lap-forming folder, 27, substantially as described.

12. The combination, with the folder 28, of the folders 25 26, having recessed wings *l t*, substantially as described.

13. The combination, with the folders 25 26, of the folder 24, having wings 18 19, substantially as described.

14. The combination, with the former, of the carrier 124, the folder 23, and folder 24 of means for reciprocating the carrier 124 and for oscillating the folder 24, all substantially as described.

15. A folder mounted to turn with the corner of the former for its center of motion, and provided with an actuating device hung behind said folder to swing upon an independent center, all substantially as described.

16. The combination, with the hollow former and table 52, of the stops 114, whereby the position of the hollow former with respect to the folders is determined, substantially as described.

17. The combination, with the former and the shaft 66, of the clutch 104, pulley 100, and lever 67, substantially as described.

18. The combination, with the former, folding mechanism co-operating therewith, and means for actuating the same, of a clutch mechanism and means operated by the driving-pulley to release the said clutch, all substantially as described.

19. The combination, with the former and the mechanisms operating it from the main shaft, of the clutch mechanism, its releasing mechanism carried by the shaft 66, and the lever 67, substantially as described.

20. The combination, with a former, of a folder, as 26, provided with lugs, as $c$ $n$, and an arm, as $e$, having bearers which travel in a curved guiding-slot, and a pivoted rock-arm, as 12, provided with fingers $m$ $u$, substantially as described.

In testimony whereof I have hereunto set my hand in the presence of two subscribing witnesses.

ORVILLE S. HARMON.

Witnesses:
T. H. PALMER,
ANTHONY N. JASBERA.